United States Patent Office 3,282,934
Patented Nov. 1, 1966

3,282,934
NITROGENOUS ESTERS OF HYDROXYLALKYL-
AMINO PHENOTHIAZINES
Margaret H. Sherlock, Bloomfield, and Nathan Sperber, North Caldwell, N.J., assignors to Schering Corporation, Bloomfield, N.J., a corporation of New Jersey
No Drawing. Filed May 15, 1964, Ser. No. 367,880
5 Claims. (Cl. 260—243)

This application is a continuation-in-part of our co-pending application, Serial No. 628,006, filed December 13, 1956, now abandoned.

This invention relates to new di-lower alkylcarbamate esters of 1-(2-hydroxyethyl) and 1-(3-hydroxypropyl)-4-[3 - (2 - trifluoromethyl - 10 - phenothiazinyl) - propyl]-piperazines, to pharmaceutically acceptable non-toxic acid addition salts thereof and to methods for their manufacture. More particularly this invention relates to dimethylcarbamyl esters of the aforementioned alcohols.

The novel esters of this invention produce an ataractic or calming effect and thus are useful as tranquilizing agents. In addition, they are of value in controlling emesis and nausea.

The di-lower alkyl carbamate esters, in particular, the dimethylcarbamate, exhibit certain unique advantages over the free alcohol, said advantages not associated with lower alkanoic acid esters, for example. In certain pharmacological tests and assays the di-alkylcarbamates may exhibit greater potency as compared with the free alcohol, however, their major advantage is a marked increase in duration of action at equal or lesser dosages with no increase in extra-pyramidal effects. Indeed, in view of its longer duration of activity, a lesser total daily dose of the di-lower alkylcarbamate may be utilized to achieve a desired result.

The prolongation of action without increase of side effects appears peculiar to the di-lower alkylcarbamates in comparison with the unsubstituted carbamate. The latter ester exhibits essentially the same profile as the free alcohol but with an increase in autonomic side effects and certain toxic manifestations. The di-lower alkylcarbamates are also characterized by a slower onset of action on low-dosage in comparison wth the free alcohol.

The novel compounds of this invention are of the group consisting of phenothiazines having the formula:

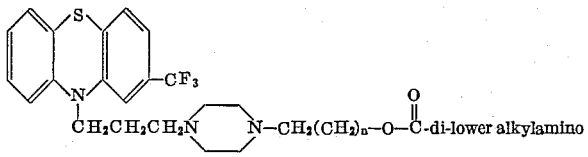

and the pharmaceutically acceptable non-toxic acid addition salts thereof wherein $n$ is a natural number less than 3.

Preferably in the foregoing $n$ is 1 and the di-lower alkylamino group is dimethylamino. It will be readily apparent to one skilled in the art that other substituted amino groups are equivalents such as diethylamino, N-methyl-N-ethylamino, cyclicamino such as pyrrolidino, piperidino, morpholino and the like.

The compounds of this invention are prepared by direct or indirect esterification of 1-(2-hydroxyethyl)- and 1-(3-hydroxypropyl)-4-[2-trifluoromethyl - 10 - phenothiazinyl)-propyl]-piperazine. The direct method involves reaction of the free alcohol with the appropriate carbamyl chloride such as dimethylcarbamyl chloride. Preferably the free alcohol is esterified with phenyl chloroformate and then treated with the appropriate secondary amine whereby the desired carbamate is produced. The carbamate esters are relatively insoluble in water but form more soluble acid addition salts which are pharmaceutically acceptable and non-toxic with a variety of organic and inorganic acids such as hydrochloric, maleic, citric, tartaric, phosphoric, sulfuric and the like.

EXAMPLE 1

*Dimethyl carbamate of 1-(2-hydroxyethyl-4-[3-(2-tri-fluoromethyl-10-phenothiazinyl)-propyl]-piperazine*

To a stirred solution of 22 g. of 1-(2-hydroxyethyl)-4-[3 - (2 - trifluoromethyl - 10 - phenothiazinyl) - propyl]-piperazine in 50 ml. of anhydrous pyridine, add 10 g. of phenyl chlorocarbonate keeping the temperature between 25–30°. Stir at room temperature for 12–16 hours, add 50 ml. of water and extract the mixture with chloroform. Wash the chloroform extracts with water, dry over sodium sulfate and concentrate to a viscous residue consisting of the phenyl carbonate of 1-(2-hydroxyethyl)-4-[3-(2-trifluoromethyl - 10 - phenothiazinyl)-propyl]-piperazine. Dissolve the phenyl carbonate in ether, and bubble through the solution, anhydrous hydrogen chloride. Recrystallize the dihydrochloride from ethanol, M.P. 201–202° C.

Dissolve 10 g. of the phenyl carbonate ester in 150 ml. of anhydrous ether. Add 75 ml. of dimethylamine and allow the reaction mixture to stand overnight at room temperature. Concentrate to a residue consisting of the dimethylcarbamate of this example.

To form the di-hydrochloride salt, dissolve the ester in 100 ml. of ethanol and add ethanolic hydrogen chloride. Dilute with ether and filter. Recrystallize the di-hydrochloride salt from ethanol-ether, M.P. 217–218° C.

Alternatively, the ester of this example is prepared as follows:

Stir and reflux a mixture of 22 g. of 1-(2-hydroxyethyl) - 4 - [3-(2-trifluoromethyl - 10 - phenothiazinyl-propyl]-piperazine, 1.3 g. of powdered sodium and 250 ml. toluene for three hours. Cool and add with stirring 13 g. of dimethylcarbamyl chloride. Reflux for three hours, cool, add water, separate the toluene layer, dry, and concentrate in vacuo to yield the ester of this example.

Dissolve the free base in ethyl acetate and treat with an excess of maleic acid in ethyl acetate. The dimaleate salt which precipitates is purified by recrystallization from methanol.

In the foregoing example, by utilizing the corresponding 1-hydroxypropyl analog of the starting material, the appropriate ester is obtained. Analogously, by utilizing other equivalent secondary amines in place of dimethylamine, such as diethylamine, pyrrolidine, piperidine, morpholine and the like, the analogous carbamate esters are obtained.

We claim:
1. A compound of the group consisting of phenyl carbonate esters having the formula:

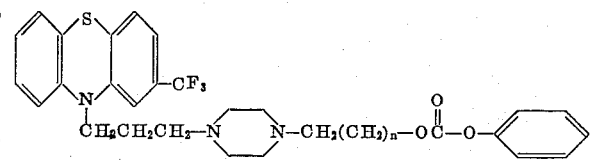

and the acid addition salts thereof wherein $n$ is a natural number less than 3.

2. The phenyl carbonate of claim 1 having the formula:

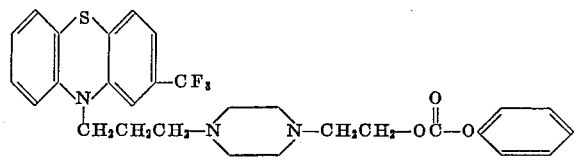

3. A phenyl carbonate ester of claim 1 in the form of its free base.
4. An acid addition salt of a compound of claim 3.
5. The dihydrochloride of the compound of claim 2.

References Cited by the Examiner

UNITED STATES PATENTS

| | | | |
|---|---|---|---|
| 2,860,138 | 11/1958 | Sherlock et al. | 260—243 |
| 2,921,069 | 1/1960 | Ullyot | 260—243 |
| 2,985,654 | 5/1961 | Sherlock et al. | 260—243 |
| 3,058,979 | 10/1962 | Ullyot | 260—243 |

FOREIGN PATENTS 833,474　4/1960　Great Britain.

JOHN D. RANDOLPH, *Primary Examiner.*